(12) United States Patent
Holbrook et al.

(10) Patent No.: US 10,427,356 B1
(45) Date of Patent: Oct. 1, 2019

(54) PLASTIC TANK HAVING A WELDED FRUSTO-CONICAL FLANGE JOINT

(71) Applicant: Infiltrator Water Technologies, LLC, Old Saybrook, CT (US)

(72) Inventors: Paul R Holbrook, Old Saybrook, CT (US); Roy E Moore, Jr., Killingworth, CT (US); Bryan A Coppes, Old Saybrook, CT (US); Gregory Trude, Bristol, CT (US)

(73) Assignee: INFILTRATOR WATER TECHNOLOGIES LLC, Old Saybrook, CT (US)

( * ) Notice: Subject to any disclaimer, the term of this patent is extended or adjusted under 35 U.S.C. 154(b) by 128 days.

(21) Appl. No.: 15/413,247

(22) Filed: Jan. 23, 2017

Related U.S. Application Data

(60) Provisional application No. 62/286,251, filed on Jan. 22, 2016, provisional application No. 62/286,256, filed on Jan. 22, 2016.

(51) Int. Cl.
   *B29C 65/00* (2006.01)
   *B32B 37/00* (2006.01)
   (Continued)

(52) U.S. Cl.
   CPC ........ *B29C 65/342* (2013.01); *B29C 66/0326* (2013.01); *B29C 66/1312* (2013.01);
   (Continued)

(58) Field of Classification Search
   CPC ..... B29C 65/02; B29C 65/34; B29C 65/3404; B29C 65/342; B29C 65/3432; B29C 65/3444; B29C 65/3452; B29C 65/3456; B29C 65/3468; B29C 65/4815; B29C 65/565; B29C 66/0326; B29C 66/1162; B29C 66/12261; B29C 66/1312; B29C 66/242; B29C 66/301; B29C 66/3024; B29C 66/54; B29C 66/541; B29C 66/5412; B29C 66/542; B29C 66/543; B29C 66/73921; B29L 2031/712; B29L 2031/7154; B29L 2031/7156; B29L 2031/7172; B65D 11/06; B65D 90/08
   USPC ..... 156/60, 69, 196, 221, 267, 272.2, 273.7, 156/273.9, 274.2, 275.7, 293, 294, 295, 156/304.1, 304.2, 304.5, 304.6, 308.2, 156/308.4, 309.6, 379.7; 285/21.1, 187,
   (Continued)

(56) References Cited

U.S. PATENT DOCUMENTS

| 3,454,179 | A | * | 7/1969 | Kerr .................. B29C 66/636 |
| | | | | 215/379 |
| 5,407,514 | A | | 4/1995 | Butts et al. |

(Continued)

FOREIGN PATENT DOCUMENTS

EP  548750 A1 * 6/1993 ............. B29C 65/34

*Primary Examiner* — Philip C Tucker
*Assistant Examiner* — Brian R Slawski
(74) *Attorney, Agent, or Firm* — C Nessler

(57) ABSTRACT

A plastic tank is comprised of two parts, a base and a top, that are permanently joined to each other by welding at a circumferential joint formed by two mating flanges of the parts. The faying surfaces of the flanges of the top and base have portions in the shape of a hollow truncated cone. Fusion weld elements are captured on the faying surfaces of the flanges of the assembled parts, and the elements melted by internal heating of metal portions of the elements.

14 Claims, 4 Drawing Sheets

(51) Int. Cl.
*B29C 65/34* (2006.01)
*B65D 6/00* (2006.01)
*B29L 31/00* (2006.01)

(52) U.S. Cl.
CPC ............ *B29C 66/542* (2013.01); *B29C 66/55* (2013.01); *B65D 11/10* (2013.01); *B29C 65/3432* (2013.01); *B29C 65/3452* (2013.01); *B29C 66/242* (2013.01); *B29C 66/54* (2013.01); *B29C 66/543* (2013.01); *B29L 2031/712* (2013.01)

(58) Field of Classification Search
USPC ........ 285/260; 219/544, 547, 633; 220/4.13, 220/4.21, 4.24; 264/248
See application file for complete search history.

(56) References Cited

U.S. PATENT DOCUMENTS

| | | | |
|---|---|---|---|
| 5,407,520 | A | 4/1995 | Butts et al. |
| 5,878,907 | A | 3/1999 | Graf |
| 7,984,738 | B2 | 7/2011 | Lamarca |
| 8,740,005 | B1 | 6/2014 | Holbrook |
| 2015/0183155 | A1* | 7/2015 | Saito .................. B29C 65/1677 210/483 |

\* cited by examiner

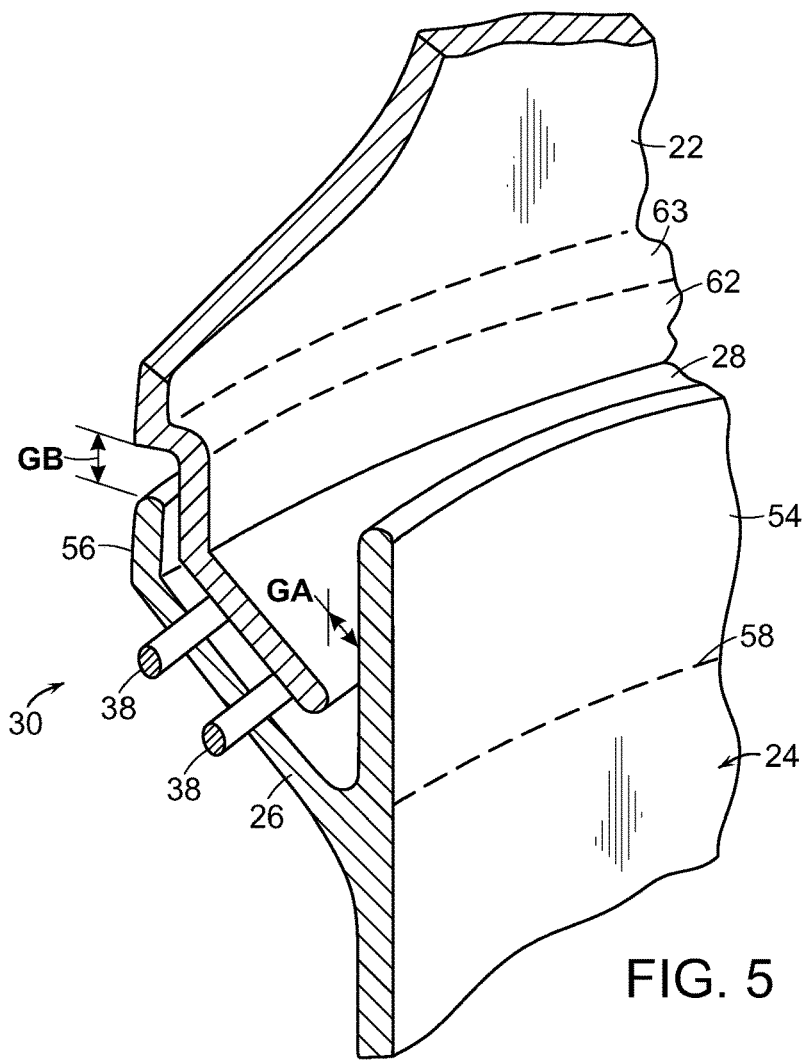
FIG. 5
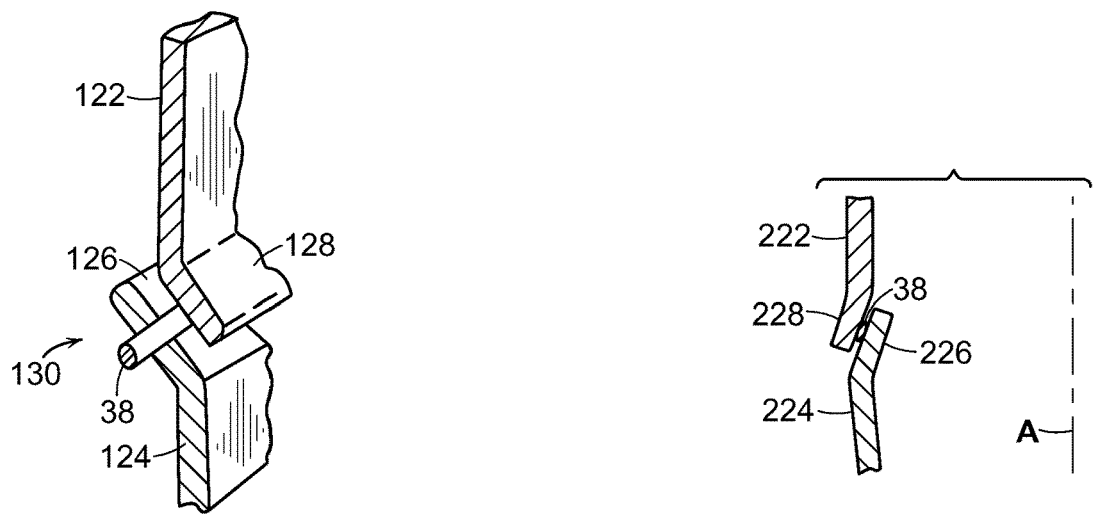
FIG. 6
FIG. 6A

PLASTIC TANK HAVING A WELDED FRUSTO-CONICAL FLANGE JOINT

This application claims benefit of provisional patent application Ser. No. 62/286,256 and Ser. No. 62/286,251, both filed Jan. 22, 2016.

TECHNICAL FIELD

The present invention relates to molded plastic tanks that are useful for storing water and other materials and methods for making same.

BACKGROUND

It is common to store water in unpressurized aboveground vessels from which water from time to time is drawn by means of pump or gravity flow, particularly where the water supply is intermittent, or where the instantaneous demand exceeds the flow rate of the source of supply. It is particularly desirable, to have a vessel which is sealed against egress or ingress of liquids when potable water is being stored.

Typical water storage tanks that are associated with dwellings and other smaller buildings will have 500 to 1000 liter capacity. A squat cylindrical shape tank is popular for reason of compactness and manufacturability. A representative 500 liter tank might be about 100 cm in diameter and 100 cm high. One approach is to make a one piece plastic tank, such as by blow molding or rotational molding. Such tanks have good integrity but owing to their bulkiness, the cost of shipping from factory to point of use can be high.

The present invention is concerned with plastic tanks that principally are intended for use when oriented as vertical cylinders, including tanks which are much larger than just mentioned. For instance, plastic tanks may have capacities of in the range of about 9,500 liters to about 11,000 liters or more. A representative tank may have a diameter of about 8 feet (2.4 meters), a height of about 8 to 10 feet (2.4 to 3.1 meters), a basic wall thickness of 0.19 to 0.4 inches (4.8 to 10 mm) and a weight of about 250 to 400 pounds (114 to 180) kilograms. If such tanks can be fabricated by mating two bucket-like parts and which are then welded to each other at or near the point of use, that can be a practical solution when the parts have sufficient draft to enable nesting for shipment.

A related commonly owned patent application bearing Ser. No. 15/413,251 and entitled "Making a plastic tank with an integrity-verifiable weld joint," filed on even date herewith, describes how such a tank can be fabricated by welding together two molded bucket-like parts at a circumferential flange. Because the parts being mated are large, they can be subject to slight manufacturing variations (e.g., those related to variations in cooling of hot molded plastic), and possible distortion during handling or temporary storage or uneven sunlight heating, etc.

Thus, if the joint does not have good fit-up, there is a chance for unsoundness of the resultant weld. Generally, it is an objective to avoid workers having to spend time fitting parts together or to provide fixtures aimed at overcoming fit-up problems. One approach with such large tank-flange joints is to use a plurality of pins or dowels, which extend from vicinity of one flange into close-fitting holes in the mating part. An example is described in connection with FIG. 3 of U.S. Pat. No. 8,740,005 of Holbrook et al. See also U.S. Pat. No. 5,878,907 of Graf. The prior art tanks have a mid-elevation joint which is alternatively secured by means of clamps or by means of welding.

SUMMARY

An object of the present invention is to provide a large vertical cylindrical style tank that can be shipped as separate nested elements and assembled with a flange joint which has good integrity. Another object is to overcome fit-up difficulties related to slight distortions and differences in dimensions amongst mass produced tank tops and bases.

In an embodiment of the present, a tank is comprised of a top and base which are welded at a joint between mating flanges of each component. The faying surfaces of the flanges of the top and base have portions in the shape of a truncated cone; that is they have a frusto-conical shape. Fusion weld elements are captured on the faying surfaces of the flanges of the assembled parts, and the elements melted by internal heating of metal portions of the elements.

In preferred embodiment of the invention, an assembly ready for fusing of the weld comprises one part of the top or base having a circular wall that extends axially from the interior of the frusto-conical flange portion of the part. The circular wall fits with clearance within the circular opening of the interior of the flange of the mating other part. That construction is preferably used in combination with a feature on the same part which comprises an axially extending sleeve at the outer edge of the frusto-conical portion of the flange, which receives a stepped wall portion of at the outer edge of the frusto-conical portion of the flange of the mating part.

In a further preferred embodiment one of the parts has a plurality of engagement tabs spaced apart around the periphery of the flange, to engage a depression in the mating part to hold the parts in mating position in a way which accommodates the movement that is associated with the uncommon welding technique being used.

The foregoing and other objects, features and advantages of the present invention will become more apparent from the following description of preferred embodiments and accompanying drawings.

BRIEF DESCRIPTION OF THE DRAWINGS

FIG. 5. is a partial vertical cross section through the joint of an assembly of top and bottom, showing the joint location prior to welding, with two strands or legs of weld element.

FIG. 6 is a view like FIG. 5 showing a simple frusto-conical joint with a single strand weld element, where the base has an outward sloping flange.

FIG. 6A is a view like that of FIG. 6 showing an alternative embodiment where the base has in inward sloping flange.

DESCRIPTION

The disclosures of provisional patent application Ser. No. 62/286,256, filed Jan. 22, 2016, entitled "Plastic water tank having conical flange joint", patent application Ser. No. 62/286,251, filed Jan. 22, 2016, entitled "Plastic water tank with integral means for weld testing," are hereby incorporated by reference.

The foregoing related applications describe how a fusion weld element is placed within the flange joint of a water tank so that two concentric welds are is created to define an annular cavity bounded by the flange faying surfaces and the spaced apart welds. Where the terminal ends of the elements emerge from the flange there is an intersection at which there is a fused mass. After welding has been accomplished, a port that runs from the exterior of the tank to the annular cavity may be connected to a vacuum source or a gas pressure source. The pressure at the port and within the annular cavity is monitored. If there no significant flow of air or other gas into or out of the cavity (as applies), that will indicate that a sound leak proof weld has been obtained. In carrying out the present invention, such weld integrity testing technology may optionally be used.

Figure 1:
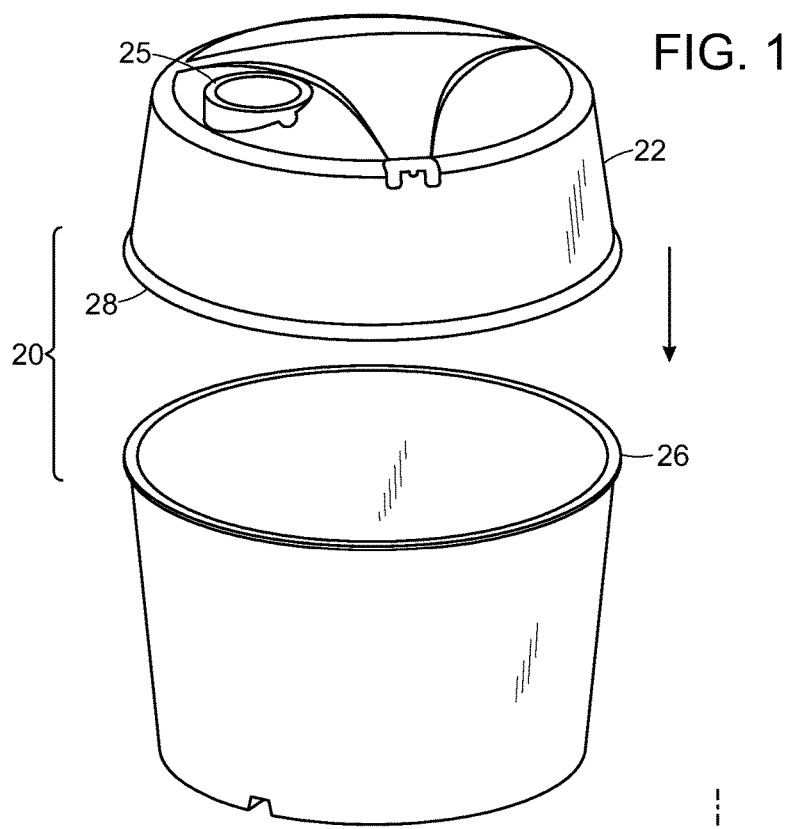
FIG. 1 is exploded view of a plastic tank comprising a base and a top with mating flanges, and a weld element positioned on the flange.
Figure 2:
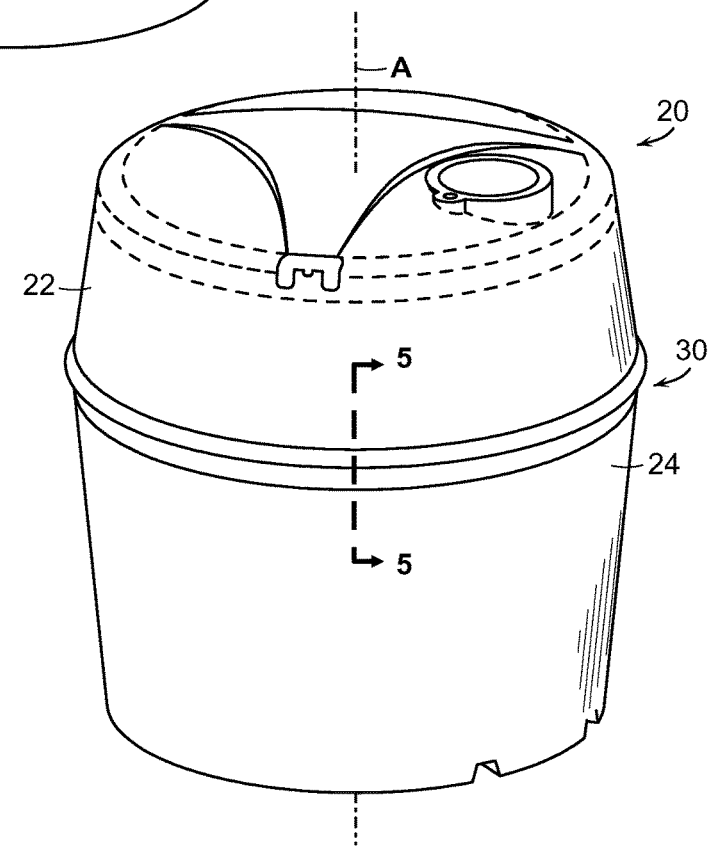
FIG. 2 shows the tank of FIG. 1 after the top has been attached to the base.

FIG. 1 and FIG. 2 show in perspective a plastic water tank 20, preferably made from injection molded polyethylene or polypropylene, having the nominal dimensions recited in the Background. While the invention is described in terms of water, the invention will be applicable to a tank fabricated or used for any liquid, including such as fertilizers and pesticides, as well as granular materials. While the invention is described in terms of a tank that has a circular cross section, is substantially cylindrical, and is used with the length axis of the cylinder in the vertical orientation, the invention is applicable to tanks having other shapes and orientations. Thus, the term "circular" and its variations will be interpreted appropriately by analogy when the tank flange is non-circular.

In FIG. 1, the parts for this embodiment are shown as they are about to mate as indicated by the arrow. In FIG. 2 the parts are mated at joint 30. Tank 20 comprises a base 24 having flange 26 and a top 22 having flange 28, both aligned along a central tank axis A. The flanges mate to each other at joint 30, which as described below is a welded joint. The base and top can be shipped in nested condition on a pallet or the like. The top has an access port 25 for filling, etc. and may have a gage port and other ports. Top 24 has scalloped features, as illustrated, for structural strengthening against exterior loads that may be applied to the top. Corrugations and other strengthening features may be formed in alternative embodiment bases and tops.

In the present invention, the joint between the flanges of the top and base is formed by welding. A preferred method of welding is to use an electrically heated weld element captured within the joint, as described in commonly owned patent application Ser. No. 14/993,858 of Bryan Coppes et al., filed Jan. 12, 2016, entitled "Fabricating a plastic stormwater chamber" (the "858 application) and in commonly owned patent application Ser. No. 14/809,124 of R. Moore and P. Holbrook, filed Jul. 24, 2015, entitled "Plastic tank having fusion welded parts" (the "124 application"), now U.S. Pat. No. 9,840,040. The method of making a flange joint in a tank is more particularly described in an application of Paul Holbrook et al. being filed on the same day as this application, bearing Ser. No. 15/413,219 and entitled "Making a plastic tank with an integrity-verifiable weld joint." The entireties of the disclosures of all said applications are hereby incorporated by reference.

A fusion weld element as the term is used here refers to a component which can be heated by electrical or electromagnetic energy, sufficient to cause localized melting and fusion of both the element and the local plastic material of the faying surfaces of parts being joined. Exemplary fusion weld elements comprise plastic with embedded metal pieces that are heated by electric resistance or electromagnetic induction are described further below.

Placement of a fusion weld element may be accomplished in different ways. In one approach the fusion weld element is positioned on or just beneath the surface of a flange which faces the mating flange surface. Component surfaces which face each other and are shaped for being made into a welded joint are referred to as faying surfaces. In one approach, the fusion weld element may be molded into the material of one of the flanges when the top or base is formed. Alternately, the element may be placed partly or wholly within in a groove on one of the faying surfaces; alternately, the element may be simply captured between the faying faces as they are pressed toward each other. Preferably, in the present invention, the latter technique is used and a fusion weld element is plastic-tack welded to a faying surface before the parts are mated. As the faying surfaces are pressed against each other, the fusion weld element is raised in temperature sufficient to melt the fusion weld element and local portions of the mating plastic surfaces. The application of electric energy is then ceased and the weld zone is allowed to cool. The resultant solid weld joint is fused plastic which weld-joins the two parts. Some metal artifact from the metal portion of the fusion weld element will typically remain within the fused plastic weld material. A fusion weld element may be placed on one of the faying surfaces, alternately an element may be placed on each faying surface when more than one element is used. Reference may be made to the patent applications mentioned above for further details and optional approaches.

The fusion weld element (which may be also referred to a fusion element or weld element or simply an element herein) which is used in a preferred embodiment of the method described above is a component which may be heated, such as by electric resistance heating or electromagnetic induction heating to induce melting of a conductive (usually metal) portion of the weld element and local plastic environment.

As an example, the fusion weld element may be a commercial product known as PowerCore™ Welding Rod (PowerCore International Ltd., Ottawa, Ontario, Canada). See also U.S. Pat. Nos. 5,407,514 and 5,407,520, the disclosures of which are hereby incorporated by reference. An exemplary PowerCore brand rod is an about 3/16 inch diameter thermoplastic rod having integrated electric resistance wires of very fine diameter. The ends of the rod run out of the joint/part at selected end points; and when the wires comprising the rod are connected to an electric power source they rise in temperature and heat the rod and surrounding plastic causing melting and fusion. The fine wires remain a part of the finished joint. That portion of the fusion weld element which sticks from the end of the joint is severed, as by shearing, and discarded.

As another example, the fusion weld element may be the preform which is part of the commercial Emabond™ electromagnetic welding system (Emabond Solutions Co., Norwood, N.J., U.S.) As described in Lamarca U.S. Pat. No. 7,984,738 (the disclosure of which is hereby incorporated by reference) the fusion weld element preform may be a structure comprised of plastic and magnetic particles. When an energized high frequency induction coil is placed in proximity to the joint, the particles act as susceptors of electromagnetic radiation and resultant induced eddy currents cause the element to become heated sufficiently to melt the preform and adjacent plastic, thereby fusing the joint. The metal particles remain within the fused plastic part.

In an embodiment of the invention, a weld element 38 is placed on one of the flanges 26, 28, preferably by tack welding; and when the flanges are mated with each other as shown in the partial cutaway view of the joint region in FIG. 5, the element is resistance-heated to melt it and adjacent flange material. When the aforementioned PowerCore element is used, electric power must be connected to the terminal ends of the element, which run out of the joint. This is the embodiment which is mostly shown, for instance in FIG. 7. When an Emabond type of weld element is used there need not be terminal ends for electrical connection.

Figure 3:
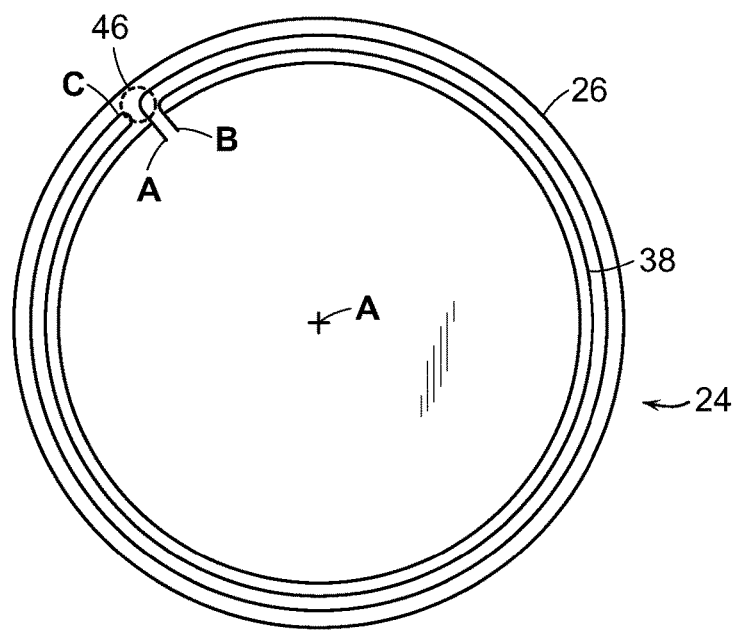
FIG. 3 is a top view of a base showing how a weld element runs on a loop-path on the flange.

FIG. 3 is a top view of a base 24 showing how a weld element 38 may be positioned on the faying surface of the flange 26 of the base. The element follows a U-shape path. The weld element has two terminal ends labeled A and B (and labeled 38T in connection with other Figures) that run nominally radially from the centerline of the assembly. The path of weld element 38 starts with one terminal end at point A, runs around the circumference of the flange to a switch back or "U turn" at point C, and returns back to a terminal end exit point B that is very close to the starting point. There is annular spacing (and after welding an annular cavity 44) between the concentric legs of the element 38.

In this description: "terminal end" refers to the portion of the weld element which is proximate the location where a weld element exits the annular joint between the flanges. The weld element, or interconnected conductors, may extend further from the flange joint location as the user may choose. The term "annular" is applied to the space/cavity between the weld elements and the welds even though, as described below a weld mass at intersection 46 interrupts the complete circularity of the annular space. Thus, in this description, "annular" encompasses a space which but for an interruption such as a mass at one or more intersections of welds would run around the entirety of a circle around the flange.

Figure 4:
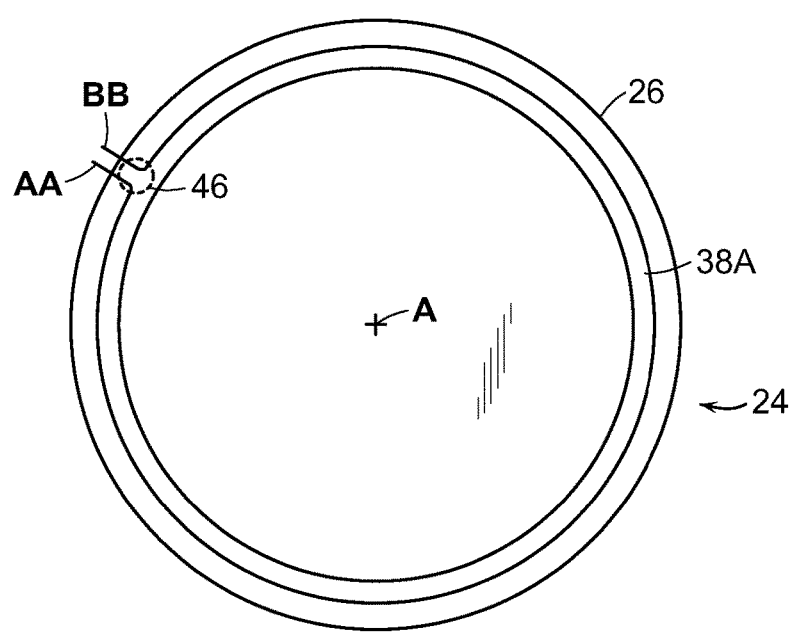
FIG. 4 is a top view of a base showing how a single strand weld element runs on the flange.

Referring to FIG. 4, in an alternative embodiment of the present invention the weld element 38A is run in a single pass from terminal end AA, around the circumference of the flange 26 to terminal end BB which is in proximity of the first terminal end. As described in the related application Ser. No. 15/413,219 and the provisional application 62/286,251, a fused mass is formed at intersections 46, shown by a dashed circle.

Figure 7:
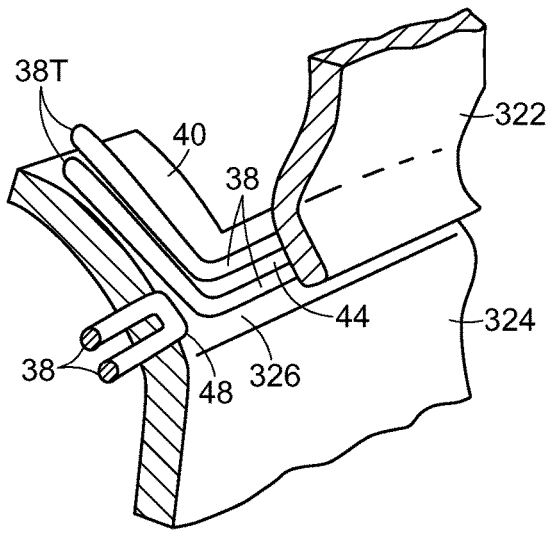
FIG. 7 is a view like FIG. 5 showing how the terminal ends of weld elements run across a tab attached to the bottom flange.
Figure 8:
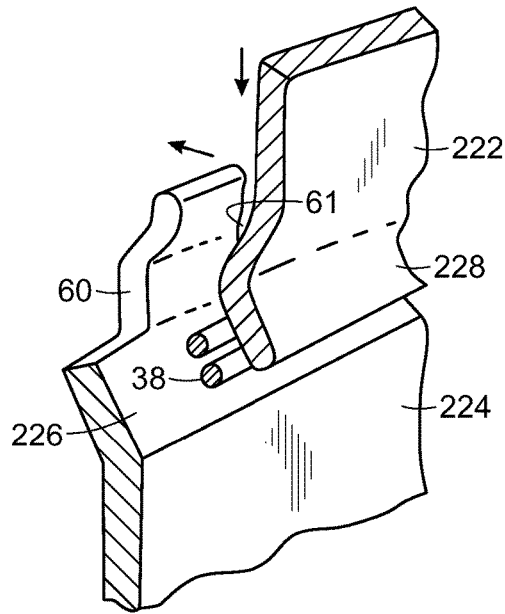
FIG. 8 is a view like FIG. 5 showing a portion of an assembly where engagement tabs on one part engage a depression on the mating part.

FIG. 5 shows a preferred embodiment of a portion of cutaway of the region comprising joint 30 where the element is like that shown in FIG. 3 or otherwise comprises two concentric element portions. FIG. 6 is a like view, showing a cutaway of a region comprising joint 130, where the element is like that shown in FIG. 4. FIG. 8 illustrates how one of several locking tabs may be used. FIG. 7 shows how the terminal ends of the fusion weld elements are preferably run for connection of the weld-fusion power supply.

FIG. 6 shows an essential joint 130 of the present invention. The base 124 and top 122 are like the base 24 and top 22 of tank 20. The flange 128 is shaped as a frustrum of a cone and slopes downwardly in the radially-inward direction. The mating flange 126 also is shaped as a frustrum of a cone and slopes upwardly in the radially-outward direction. Weld element 38 is captured between the flanges. The sloped flanges ensure that the base and the top are aligned with each other with respect to the central axis. In this and the other embodiments, it will be understood that reciprocal arrangement of the flanges can be used. For example, as illustrated by the partial vertical cross section of a tank shown in FIG. 6A, an alternate embodiment comprises a base 224 having a flange 226 that slopes in the radially-inward direction toward center axis A and a top 222 that has a flange 228 that slopes in the radially-outward direction.

The truncated conical shape of the faying surfaces of the flanges is found advantageous compared to flanges which run perpendicular to the vertical axis A of the tank parts. The sloping flange surfaces cause self-centering of the parts, and thus provide better accommodation when there are variations in the circularity or diameters of mating parts.

In the generality of the invention, the faying surfaces of the mating flanges of the top and base are canted with respect to the vertical axis of the top or base; that is, they are substantially off-perpendicular. In preferred embodiments of the invention, at least one of the mating ends of either the top or bottom—preferably both—has a circular wall that fits with clearance within the circular opening of the flange of the mating bottom or top.

Referring again to FIG. 5, base 24 has a circumferential wall 54 and an upwardly-sloping radially-outward extending flange 26 which has an outer upward extending portion, namely sleeve 56. The upper end of wall 54 extends vertically beyond the elevation of flange 26 (marked by dashed line 58). Top 22 has a wall 62 with a step 63; the downward-sloping radially-inwardly-running flange 28 extends from wall 62. When the base and top are assembled for welding, as shown, flange 28 rests on weld element 38, which are captured between it and flange 26. Prior to the mating of the top and base the weld element preferably was tack welded to flange 28 or flange 26. Implicit from what is said elsewhere in this description, the configuration of wall 54 and flange 26 can be put on the top and the base can be configured like the top in other embodiments of the invention.

The joint configuration of FIG. 5 is particularly useful when the tank parts are about 8 feet (2.4 m) in diameter. The top will preferably be hoist-lowered onto the base to mate the parts for welding and thus a degree of self-aligning is helpful. In the mating process, the lower end of flange 28 first slips over the upper end of wall 54, achieving an initial essential alignment. To accommodate variations and distortions, there is preferably a radial gap GA between the parts, of approximately 0.07 inches (1.8 mm).

Then, as the lowering continues sleeve 56 engages wall 62 (where there preferably is another gap like the gap GA). Finally, lowering is impeded by contact of both flanges with the weld elements 38. At that point there will be a gap GB at the outer periphery of flange 26 between the upper edge of sleeve 56 and the step 63 of wall 62 of flange 26.

Then, the weld elements are heated to melt them; as that happens the weight of the top and such additional force as may be necessary causes the gap GB to decrease and the flanges to move closer to each other. When the weld elements are cooled, the faying surfaces of the mated flanges are fused to each other, to form the welded joint. Gap GB diminishes and the amount of change may be measured to verify that good weld element fusion has taken place. A typical PowerCore weld element that may be used will have a diameter of about 0.19 inch before heating.

While the combination of wall 54 and sleeve 56 are preferred in the generality of the invention it will be useful to use parts which comprise one of the wall or the sleeve.

FIG. 7 is a view also like that of FIG. 5 and FIG. 6, showing how in making a joint between a base 324 and a top 322 a preferred weld element 38, described fully in the related application Ser. No. 15/413,219, has a loop end 48 that is in proximity to the location of the terminal ends 38T of the element. The ends are connectable to an electric power supply. As shown in FIG. 7, the ends 38T preferably run across element-holding tab 40 which extends from the outer edge of flange 326 of base 324. Not shown, the top has a like tab that mates with the tab 40 so the weld element terminal ends run in captured-fashion between the two tabs. After welding is completed, preferably the tabs and residual weld elements within are severed from the periphery of the flange.

While the invention here and in the related applications concentrates on use of the PowerCore welding element, in carrying out different embodiments of this present invention an Emabond welding element may be used.

FIG. 8 is a view like that of FIG. 5 and FIG. 6, showing a further aspect of the present invention. Base 224 has a flange 226 which receives the flange 228 of top 222. Spaced apart around the outer edge of flange 226 is a plurality of spaced apart engagement tabs 60, one of which is shown. Tabs 60 run generally parallel to the length axis of the assembled parts and have terminal ends shaped with features for being received in depressions in the top 222. Preferably, top 222 is configured with a circumscribing bulge at its lower end, or otherwise, so that it has on its exterior surface a circumferential depression 67 which is engaged by the end of each tab 60, the end of which—as indicated by the arrows—springs outwardly as the top is lowered to mate the flanges.

Tabs 60 hold the parts in temporary engagement, until the welding step is completed while allowing the parts to move closer together during welding as described in connection with FIG. 5. Instead of a circumscribing depression, a plurality of localized depressions may be made, one each for receiving a terminal end of one of the engagement tabs.

Figure 9:
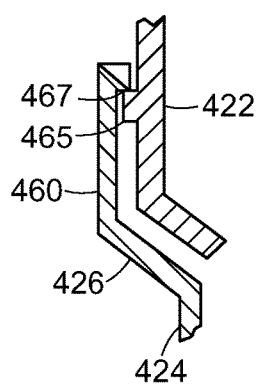
FIG. 9 is a partial cross section of an assembly, showing how an upward extending tab of the base engages an external ridge on the mating top.

Instead of having tabs, the ends of which are received in depressions, other engagement features may be used. For instance, as shown in FIG. 9 a tab 460 extending from flange 426 of base 424 may have a circumferentially running lip 467 which latches over a circumscribing running ridge 465 on the mating part top 422. Engagement tabs may be alternatively be attached to the top, to engage a feature on the base; they may optionally be positioned on the interior of the tank parts. Tabs like tabs 60 may be employed in the other tank embodiments which are described herein. In the generality of this aspect of the invention, the flange of one of the base or the top comprises a plurality of engagement tabs extending in the length axis direction and the surface of the mating top or base has a plurality of engagement features for mating with said tabs.

While the invention has been described in terms of its application to a tank, that is, to a vessel which has one or both ends closed, the invention can be used on the flanges of other objects including but not limited to such as lengths of pipe or conduits.

For ease of description, the invention has been described with respect to a tank that is used with the length axis vertical and which therefore has a base and a top. However, the invention can be used with plastic tanks and other structures, where the length axis has a non-vertical orientation. The way in which the preferred embodiments have been described and the use of vertical-axis associated nomenclature shall not be construed so as to limit limiting the generality of the invention; and the scope of claims shall comprehend non-vertical axis orientation articles and their equivalent elements.

The invention, with explicit and implicit variations and advantages, has been described and illustrated with respect to several embodiments. Those embodiments should be considered illustrative and not restrictive. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. A method of forming a plastic tank having a weld joint between a substantially annular flange of a tank base and a mating annular flange of a tank top, each flange having a faying surface, wherein said base and top are configured to mate at said flanges with each other along a lengthwise axis, for forming a weld joint therebetween which comprises:
   (a) providing said tank base and said tank top, wherein the faying surfaces of the flanges have mating frusto-conical shapes;
   (b) positioning at least one weld element on at least one said flange faying surface, and mating the flanges of the base and the top with each other to form mated flanges and to capture the at least one weld element between the faying surfaces of the mated flanges, so that said at least one weld element may be heated, melted, and fused to said mated flanges, thereby to form a weld joint between the flanges; and,
   (c) heating the at least one weld element to fuse said at least one weld element to said mated flange faying surfaces.

2. The method of claim 1 wherein in step (b) said at least one weld element has two terminal ends which extend radially from the mated flanges; wherein the at least one weld element has a loop with a U turn portion captured between the mated flanges; and wherein the U turn portion and the two terminal ends are positioned at an intersection proximate where the terminal ends extend radially from the mated flanges.

3. The method of claim 2 wherein, in step (a) the flange of each of said base and said top has at least one tab extending radially from the respective flange thereof; wherein, in step (b) the tabs mate with each other when the flanges and the associated faying surfaces of the top and base are mated; wherein, step (b) further comprises running the terminal ends of the weld elements between the mated tabs; and, after step (c), shearing off said tabs and the terminal ends of the fused at least one weld element.

4. The method of claim 1 wherein the flange of at least one of the tank base or the tank top provided in step (a) comprises a plurality of engagement tabs extending lengthwise and wherein the other of the tank base or the tank top has a plurality of engagement features for mating with said engagement tabs.

5. The method of claim 1 wherein the flanges of the tank base and the tank top provided in step (a) comprises:

(i) a sleeve running lengthwise from a radially exterior portion of the flange of one of the tank base or the tank top, the sleeve having a lengthwise end; and, (ii) a wall portion running lengthwise from a radially exterior portion of the other of said one of the tank base or the tank top, the wall portion having a step;

wherein, step (b) further comprises positioning said wall portion within said sleeve with a lengthwise gap between said sleeve lengthwise end and said wall portion step; and wherein said gap decreases in lengthwise dimension during step (c).

6. The method of claim 5 further comprising: after step (c), observing a reduction in dimension of said gap, for verifying that said weld element has melted and said faying surfaces are fused.

7. An assembly for forming a plastic tank having a weld joint which is made by means of melting one or more fusion weld elements, the assembly comprising:

a tank base having a flange with a frusto-conical faying surface;

a tank top having a flange with a frusto-conical faying surface;

a fusion weld element having terminal ends;

wherein said tank base and said tank top are mated with each other so that the flange faying surfaces are mated with each other and so the fusion weld element is captured between said mated faying surfaces with said terminal ends extending outwardly from said mated faying surfaces.

8. The assembly of claim 7 wherein the flanges of the tank base and the tank top comprises a sleeve running lengthwise from a radially exterior portion of the flange of one of the tank base or the tank top, the sleeve having a lengthwise end; and, a wall portion running lengthwise from a radially exterior portion of flange of the other of said one of the tank base or the tank top, the wall portion having a step;

wherein the wall portion is positioned within said sleeve and said sleeve lengthwise end is spaced apart from said step by a gap.

9. The assembly of claim 7 further comprising: a plurality of engagement tabs extending lengthwise from one of said tank base or said tank top; and a plurality of engagement features on the other of said tank base or said tank top; each engagement tab shaped for engaging one of said engagement features to allow said tank top and said tank base to move closer to each other but not apart from each other.

10. The assembly of claim 9 wherein the plurality of engagement tabs are positioned on an exterior of said one of said tank top or said tank base.

11. The assembly of claim 9 wherein said one of said tank base or said tank top has a plurality of engagement tabs which are resilient tabs and the other of said tank base or said tank top has engagement features which are depressions.

12. A tank comprising the assembly of claim 7, produced by heating said fusion weld element to cause melting thereof and to form a weld between the mated faying surfaces of the flanges.

13. A tank comprising the assembly of claim 8, produced by heating said fusion weld element to cause melting thereof and to form a weld between the mated faying surfaces of the flanges.

14. A tank comprising the assembly of claim 9, produced by heating said fusion weld element to cause melting thereof and to form a weld between the mated faying surfaces of the flanges.

* * * * *